(12) United States Patent
Fan (10) Patent No.: US 10,756,373 B2
(45) Date of Patent: Aug. 25, 2020

(54) FUEL CELL SYSTEM AND METHOD OF PROVIDING SURFACTANT FUEL BUBBLES

(71) Applicant: Chinbay Q. Fan, Chicago, IL (US)

(72) Inventor: Chinbay Q. Fan, Chicago, IL (US)

(*) Notice: Subject to any disclaimer, the term of this patent is extended or adjusted under 35 U.S.C. 154(b) by 179 days.

(21) Appl. No.: 15/852,471

(22) Filed: Dec. 22, 2017

(65) Prior Publication Data

US 2019/0198901 A1  Jun. 27, 2019

(51) Int. Cl.

| | |
|---|---|
| *H01M 8/1004* | (2016.01) |
| *H01M 4/90* | (2006.01) |
| *H01M 4/86* | (2006.01) |
| *H01M 8/0662* | (2016.01) |
| *H01M 8/04007* | (2016.01) |
| *H01M 8/04119* | (2016.01) |
| *H01M 8/1009* | (2016.01) |
| *H01M 8/1018* | (2016.01) |
| *H01M 8/1016* | (2016.01) |
| *H01M 4/92* | (2006.01) |
| *H01M 4/88* | (2006.01) |
| *H01M 8/04223* | (2016.01) |

(52) U.S. Cl.
CPC ....... *H01M 8/1004* (2013.01); *H01M 4/8652* (2013.01); *H01M 4/881* (2013.01); *H01M 4/9041* (2013.01); *H01M 4/9075* (2013.01); *H01M 4/921* (2013.01); *H01M 4/926* (2013.01); *H01M 8/04007* (2013.01); *H01M 8/04134* (2013.01); *H01M 8/0662* (2013.01); *H01M 8/1009* (2013.01); *H01M 8/1016* (2013.01); *H01M 8/04253* (2013.01); *H01M 2008/1095* (2013.01); *H01M 2250/20* (2013.01)

(58) Field of Classification Search
CPC ............ H01M 8/1004; H01M 4/8652; H01M 4/9075; H01M 4/9041; H01M 4/881; H01M 4/921; H01M 4/926; H01M 8/1016; H01M 8/0662; H01M 8/04007; H01M 8/04134; H01M 8/1009; H01M 8/04253; H01M 2008/1095; H01M 2250/20; H01M 8/04014
See application file for complete search history.

(56) References Cited

U.S. PATENT DOCUMENTS 8,790,506 B2 * 7/2014 Deptala ................. B01D 53/22
205/763
9,698,429 B2   7/2017 Kim et al.
(Continued)

FOREIGN PATENT DOCUMENTS

WO  WO-2010009058 A1 *  1/2010  .......... H01M 4/8631

OTHER PUBLICATIONS

D. B. Spry and M. D. Fayer, "Proton Transfer and Proton Concentrations in Protonated Nation Fuel Cell Membranes," Journal of Physical Chemistry B, 2009, vol. 113, No. 30, pp. 10210-10221.

*Primary Examiner* — Maria Laios
*Assistant Examiner* — Kwang Han
(74) *Attorney, Agent, or Firm* — Fitch, Even, Tabin & Flannery, LLP (57) ABSTRACT

A fuel cell system and method are provided. One or more surfactants are used as a hydrogen carrier and/or coolant for hydrogen fueled proton exchange membrane fuel cells. The surfactant can work as a bubbler to trap hydrogen as fine bubbles with cooling water to feed the fuel cell anode. The water acts as humidification supplier and coolant.

21 Claims, 4 Drawing Sheets

(56) References Cited

U.S. PATENT DOCUMENTS

| | | | |
|---|---|---|---|
| 2005/0084727 A1* | 4/2005 | Kiefer | C08J 5/2218 |
| | | | 429/483 |
| 2009/0324452 A1* | 12/2009 | Salinas | B01J 4/001 |
| | | | 422/162 |
| 2011/0027667 A1* | 2/2011 | Sugimoto | C01B 3/065 |
| | | | 429/410 |
| 2012/0269694 A1* | 10/2012 | Zheng | C01B 3/065 |
| | | | 422/187 |
| 2014/0154595 A1* | 6/2014 | McKay | H01M 12/08 |
| | | | 429/410 |

* cited by examiner

FUEL CELL SYSTEM AND METHOD OF PROVIDING SURFACTANT FUEL BUBBLES

FIELD OF THE INVENTION

The present application generally relates to fuel cells and, more particularly, to methods and apparatus for providing fuel to various types of fuel cells.

BACKGROUND OF THE INVENTION

Conventional proton exchange membrane fuel cells (PEMFCs) have been under development for many years. However, PEMFCs still suffer from a number of issues and difficulties. For example, cooling and water management issues typically present challenges in PEMFC development and use. In this regard, fuel cells must be adequately cooled while also not oversaturating the fuel cell or otherwise hindering delivery of hydrogen gas to the catalyst layer in the fuel cell. Similarly, there are concerns for hydrogen safety. For example, if the fuel cell is not adequately cooled, it may overheat, which can be especially problematic with hydrogen gas.

Similarly, hot spot formation in fuel cell stack can cause fuel cell performance degradation. For example, if certain areas of the fuel cell become much warmer or cooler than other areas, the performance of the localized temperature gradients may have decreased performance compared to other areas. This, in turn, can decrease overall fuel cell performance. Therefore, there is a need to provide more efficient and effective cooling in fuel cells.

Many fuel cells, such as PEMFCs, include multiple bipolar plates for providing flow paths for the anode, cathode, coolant, etc. Oftentimes multiple plates are required for each cell in a fuel cell stack to perform these numerous functions. However, by including multiple plates for each cell extra expense and weight are added. In this regard, it may be helpful to minimize the number of bipolar plates used.

As noted above, depending on the fuel cell type, humidification must be provided, such as to keep the membranes used therein adequately humidified during operation. However, such humidifiers can be expensive and heavy. Similarly, the associated pumps and controllers for the humidification, coolant, hydrogen, as well as other gases and liquids have limited lifetimes and typically require regular maintenance. Therefore, decreasing the number of pumps, controllers, and the like may decrease maintenance required on certain types of fuel cells.

In other forms, hydrogen, air, impurities, and the like can accumulate on the catalyst layers in the fuel cell and degrade performance. However, it can be difficult to effectively and efficiently remove those impurities, especially while the fuel cell is in operation. Therefore, it may be helpful to remove impurities and other materials from the catalyst layer and fuel cell generally. This may be especially helpful if done continuously during fuel cell operation.

Further, carbon dioxide can poison fuel cells, such as alkaline fuel cells. Therefore, it may be helpful to remove and/or prevent carbon dioxide therein.

SUMMARY OF THE INVENTION

In one form, one or more surfactants are used as a hydrogen carrier and/or coolant for hydrogen fueled proton exchange membrane fuel cells. The surfactant can work as a bubbler to trap hydrogen as fine bubbles with cooling water to feed the fuel cell anode. The water acts as humidification supplier and coolant.

According to one form, the surfactant can be a linear alkyl benzene sulfonic acid related chemical, which forms hydrogen bubbles, increases proton exchange membrane conductivity, acts as water carrier to cool the fuel cell, and scavenges the impurities from hydrogen stream. This cooling technology provides cooling in situ where needed instead of cooling plates as typically found in conventional fuel cells. This cooling technology eliminates cooling plates and humidifiers for both anode hydrogen and cathode oxygen (air) gases. Further, the impurities from hydrogen stream, e.g., ammonia, chlorine, trace metals from other contamination, can be scavenged by the surfactant. Thus, the effect of the impurities can be reduced. Moreover, in some forms, the waste/recycle of the cooling water can be used as detergent for further applications.

In one form, by the addition of the surfactant, the freezing point decreases, which helps the fuel cell stack cool start. The in-situ cooling cools the reaction area directly and the cooling efficiency increases. Meanwhile, the direct cooling can help prevent fire.

According to one form, the bubbles on the electrode help the mass transportation and water circulation. At cathode side, the surfactant can help to remove dusty particulates from air to protect the gas diffusion electrode and catalyst layer.

In one form, the concepts described herein can be used for alkaline fuel cells. The surfactant can be in the form of salt and generate hydrogen and oxygen bubbles to feed the fuel cell. Meanwhile, since the surfactant salt has strong sulfonate group ($—SO_3—$), the $CO_2$ poisoning can be reduced and/or eliminated.

These and other aspects will be understood from the below description.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Polymer electrolyte membrane (PEM) fuel cells are the current focus of research for fuel cell vehicle applications. PEM fuel cells are made from several layers of different materials. The main parts of a PEM fuel cell are described below.

One of the main components of a PEM fuel cell is the membrane electrode assembly (MEA), which includes the membrane, the catalyst layer, and gas diffusion layers (GDLs).

Hardware components used to incorporate an MEA into a fuel cell include gaskets, which provide a seal around the MEA to prevent leakage of gases, and bipolar plates, which are used to assemble individual PEM fuel cells into a fuel cell stack and provide channels for the gaseous fuel and air.

Membrane Electrode Assembly

The membrane, catalyst layers (anode and cathode), and diffusion media together form the membrane electrode assembly (MEA) of a PEM fuel cell.

The polymer electrolyte membrane, or PEM (also called a proton exchange membrane)—a specially treated material that looks similar to ordinary kitchen plastic wrap—conducts only positively charged ions and blocks the electrons. The PEM design is significant to the overall fuel cell performance. It permits only the necessary ions to pass between the anode and cathode. Other substances passing through the electrolyte would disrupt the chemical reaction. For transportation applications, the membrane is very thin—in some cases under 20 microns.

A layer of catalyst is added on both sides of the membrane, the anode layer on one side and the cathode layer on the other. In one form, catalyst layers include nanometer-sized particles of platinum and/or other catalysts dispersed on a high-surface-area carbon support. This supported platinum catalyst is mixed with an ion-conducting polymer (ionomer) and sandwiched between the membrane and the GDLs. On the anode side, the platinum catalyst enables hydrogen molecules to be split into protons and electrons. On the cathode side, the platinum catalyst enables oxygen reduction by reacting with the protons generated by the anode, producing water. The ionomer mixed into the catalyst layers allows the protons to travel through these layers. It should be appreciated that this is one example of the catalyst layer and that other forms of catalysts and materials may be used, depending on a variety of factors including, but not limited to, the type of fuel cell, temperatures, humidity, fuel, etc.

The gas diffusion layers (GDLs) sit outside the catalyst layers and facilitate transport of reactants into the catalyst layer, as well as removal of product water. In one form, each GDL may be composed of a sheet of carbon paper in which carbon fibers are partially coated with polytetrafluoroethylene (PTFE). Other GDL materials and assemblies may also be used. Gases diffuse rapidly through the pores in the GDL. These pores can be kept open by the hydrophobic PTFE, which prevents excessive water buildup. In some forms, the inner surface of the GDL is coated with a thin layer of high-surface-area carbon mixed with PTFE, called the microporous layer. The microporous layer can help adjust the balance between water retention (needed to maintain membrane conductivity) and water release (needed to keep the pores open so hydrogen and oxygen can diffuse into the electrodes).

The MEA is the part of the fuel cell where power is produced, but various hardware components are required to enable effective MEA operation. Each individual MEA typically produces less than 1 V under general operating conditions, but most applications require higher voltages. Therefore, multiple MEAs are usually connected in series by stacking them on top of each other to provide a usable output voltage. Each cell in the stack is sandwiched between two bipolar plates to separate it from neighboring cells. These plates, which may be made of metal, carbon, or composites, provide electrical conduction between cells, as well as provide physical strength to the stack. The surfaces of the plates typically contain a flow field, which is a set of channels machined or stamped into the plate to allow gases to flow over the MEA. Additional channels inside each plate may be used to circulate a liquid coolant.

Each MEA in a fuel cell stack is sandwiched between two bipolar plates, but gaskets must be added around the edges of the MEA to make a gas-tight seal. These gaskets are usually made of a rubbery polymer or other similar material.

Figure 1A:
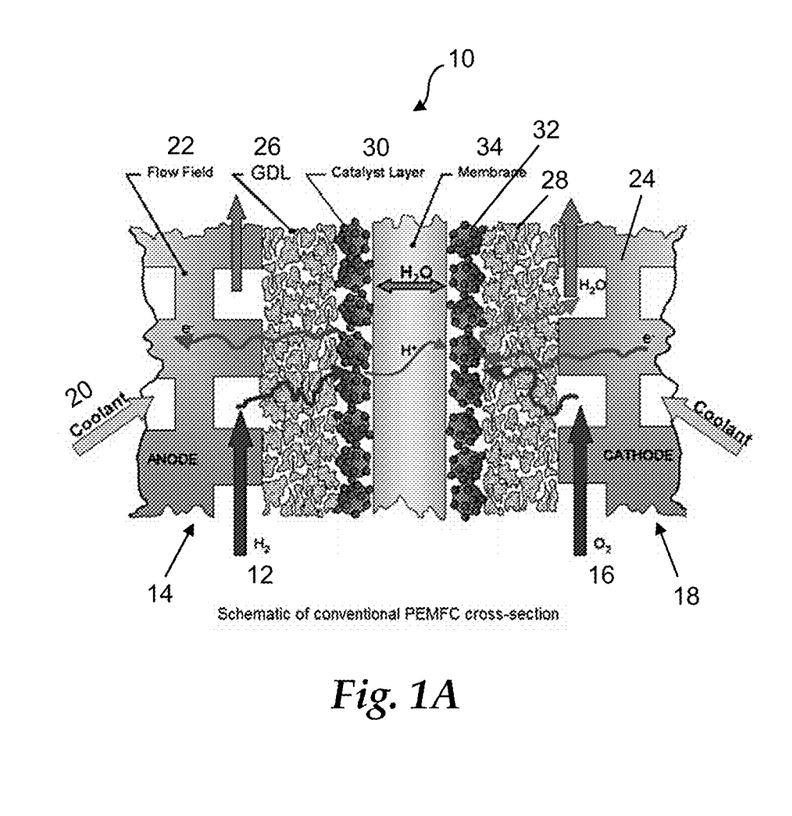
FIGS. 1A and 1B are a schematic comparison of a prior art PEMFC and one embodiment of a PEMFC in accordance with the present disclosure.

As shown in FIG. 1A, a conventional fuel cell 10 is shown, hydrogen 12 is fed to the anode side 14 and oxygen (air) 16 to the cathode side 18. Coolant 20 (i.e., water) flows through the anode plate 22 and the cathode plate 24 (i.e., bipolar plate). The design of plate 22,24 is significant to cool the cell uniformly. Generally, the fuel cell 10 is hot in the middle and cool at the sides. The thermal dispersion depends on the thermal conductivity of plates 22,24 and gas diffusion electrodes 26,28, especially under gas filled conditions as thermal conductivity is low. The hottest area is on the surface of the catalyst layers 30,32. The path from hottest catalyst surface to coolant 20 is not thermally transportation effective and efficient. Membrane 34 separates the anode 14 from the cathode 16.

Figure 1B:
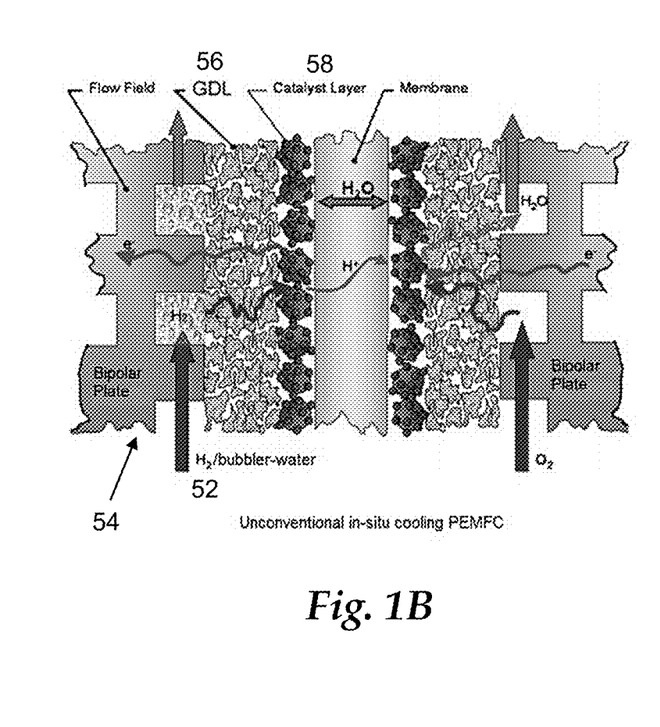

In the approaches described herein, the configuration and operation of the fuel cell can be modified to improve upon some of these deficiencies. FIG. 1B illustrates one embodiment that has been modified compared to FIG. 1A. Not all features have been identified in FIG. 1B as they are generally similar to those found in FIG. 1A.

As shown in FIG. 1B, fuel cell 50, such as a PEMFC provided whereby a plurality of bubbles 52 containing hydrogen gas is fed into the anode 54. The plurality of bubbles 52 traps hydrogen inside and releases the hydrogen on the GDL 54 and/or surface of the catalyst layer 58.

The bubble composition, which will be described in more detail below, may have hydrophobic and hydrophilic tails in one form, which enable good transient contact with the GDL 56 (30% Teflon with carbon fiber) and catalyst layer 58 (30% Nafion, a proton exchange ionomer from DuPont). Teflon is hydrophobic and Nafion is hydrophilic. The bubbles 52 may also contain water, which promotes the product proton (H+) transportation from anode to cathode. The bubble composition may be a good moderator for the three phase (gas, catalyst, and proton exchange membrane) area to support hydrogen oxidation.

After the hydrogen reaction, the bubble composition with water becomes a liquid to carry away heat from the hydrogen reaction and leave the three-phase area by other bubbles. In this form, this technology can be used to cool the fuel cell where needed. In some forms, bubble formation and water content can be significant to enable heat removal, hydrogen delivery and water proton transportation.

In many configurations, foams may be a two-phase medium of gas and liquid with a particular structure consisting of gas pockets trapped in a network of thin liquid films and plateau borders. Some well-known foams are bubble baths, dishwater detergents and the foam head on beers. Many oils foam when trapped gas is suddenly released under conditions of an abrupt drop in pressure. In some refiners in which the flow of gas at high temperature and pressure is required to crack hydrocarbons, the gas-liquid mixtures will foam strongly. The foam traps gas with gas fractions of 80% or higher.

At the catalyst surface of a PEMFC, liquid water, gas phase, and solid catalyst accompanied with proton conductive agent are needed for the hydrogen oxidation and oxygen reduction. Surfactants have been used for fuel cell catalysts and membrane production, such as found in U.S. Pat. No. 9,698,429 B2. However, the approach taken in the reference is significantly different from the approach described herein as the previous approach does not utilize the surfactant as hydrogen carrier and/or coolant. In U.S. Pat. No. 9,698,429 B2, Kim et al. applied surfactants for catalyst preparation. Other surfactant use includes detergent and water treatment agents. These are significantly different from the approaches described herein.

The selection of surfactant for forming the bubbles can vary depending on the overall conditions desired/used, the type of fuel cell, and the like. In one form, the surfactant can be a replaced linear alkyl benzene sulfonic acid (LABSA), such as alkyldiphenyloxide disulfonic acid. Oxidation resistant surfactants may also be used such as, for example, DOWFAX™ alkyldiphenyloxide disulfonate salts as they have excellent stability and solubility in acidic, alkaline, bleach, and other oxidizing systems. They can also function as a dispersant, emulsion stabilizer, and rinse easily from a surface. In a fuel cell system, the stability and solubility can be important. However, in some forms, depending on the fuel cell type, the surfactant cannot be in a salt form. Any salt form can affect proton exchange membrane conductivity. LABSA and DOWFAX™ acid forms are appropriate for the application as hydrogen bubblers to carry hydrogen with water as coolant. Since water is needed, the surfactant should generally be soluble or mixable with water. Further, in one form, the surfactant should not be toxic and should not be flammable.

Other compositions and components may be used to form the bubbles. For example, other materials may include, but are not limited to, octanesulfonic acid, methanesulfonic acid, 1-dodecanesulfonic acid, perfluoroctanesulfonic acid (PFOS), perfluorohexane sulfonic acid, and the like, as well as combinations thereof. In one form, the surfactant used to form the bubbles can be used to provide high proton conductivity, reduce bipolar plate corrosion, and/or function as a coolant for heat removal.

Other compositions and components may be used to form the bubbles. For example long-chain n-alkylphosphonic acid, such as n-decylphosphonic acid, n-dodecylphosphonic acid, n-hexadecylphosphonic acid, n-hexylphosphonic acid, n-octadecylphosphonic acid, n-octylphosphonic acid, n-tetradecylphosphonic acid, and other similar forms. The solubility of the linear alkyl phosphonic acid in water is not as high as the linear alkyl sulfonic acid. The hydrogen bubbles could be formed at the interface between water and the surfactant.

The following table presents the conductivity versus concentration of sulfuric acid at room temperature.

TABLE 1

| Weight (%) | Sulfuric Acid (microsiemens/cm) |
|---|---|
| 0.0001 | 8.8 |
| 0.0003 | 26.1 |

TABLE 1-continued

| Weight (%) | Sulfuric Acid (microsiemens/cm) |
|---|---|
| 0.001 | 85.6 |
| 0.003 | 251 |
| 0.01 | 805 |
| 0.03 | 2180 |
| 0.1 | 6350 |
| 0.3 | 15800 |
| 1 | 48500 |
| 3 | 141000 |
| 5 | 237000 |
| 10 | 427000 |
| 20 | 709000 |
| 30 | 828000 |
| 40 | 770000 |
| 50 | 620000 |
| 75 | 182000 |
| 100 | 10000 |

Commercial available Nafion has 0.1 S/cm, which is equivalent to 1.56% or 0.16M of sulfuric acid. The pH is 0.49. Nafion pH was reported to have different data because the membrane is very sensitive to humidity. In order to obtain better performance than Nafion, the proton concentration needs to be more than 0.16M. In an extreme case, Nafion contains 1.4M (Spry and Fayer, J. Phys. Chem. B2009, 113, 10210-10221), the following table presents the percentage of some examples of surfactants for the fuel cells at low proton concentration (0.16M) and high proton concentration 1.5M. Increase in concentration of surfactant results in increasing number of bubbles.

TABLE 2

| Surfactant | Molecular Weight (g/mole) | Weight of the surfactant at 0.16M [H$^+$] (g) | Weight percent at 0.16M [H$^+$] (%) | Weight of the surfactant at 1.5M [H$^+$] (g) | Weight percent at 1.5M [H$^+$] (%) |
|---|---|---|---|---|---|
| 1-Octanesulfonic acid | 194.298 | 31.09 | 3.019 | 291.45 | 29.15 |
| Linear alkylbenzene sulfonic acid | 326.49 | 52.24 | 5.224 | 489.74 | 48.97 |
| Perfluorooctanesulfonic acid | 500.13 | 80.02 | 8.002 | 750.20 | 75.02 |

In one form, the surfactant concentration ranges from 3% (w/w) to 75% (w/w).

An exemplary form of fuel cell has flow rate and performance as shown in the following table at ambient pressure. In the case of the pressurized system, the hydrogen bubbler tank gas inlet could be 80 psi and the fuel cell stack pressure could be up to 45 psi. It should be appreciated that other forms of fuel cells and fuel cell stacks are contemplated.

TABLE 3

| Active Area | 400 | cm$^2$ | | | |
|---|---|---|---|---|---|
| Number of Cells | 1 | cells | Volts | 0.6 | V |
| Current Density | 1.000 | A/cm$^2$ | Power | 240 | Watts |
| Total Amps | 400 | A | Power | 0.24 | kW |
| Anode Flows | 1.20 | Stoic. | 83% | Utf | Calc % |
| H$_2$ Flow | 3.648 | L/min | 0.1289 | CFM | 100.0% |
| Cathode Flows | 2.00 | Stoic | 50% | Utox | |
| Air Flow | 14.478 | L/min | 0.5116 | CFM | |

In one form, ionic surfactants migrate faster than non-ionic surfactants and can transport heat even faster. Therefore, in some forms, ionic surfactants can be chosen.

The radius of a bubble is generally directly proportional to the surface tension and the radius of the bubbler pore size, and inversely proportional to the difference in densities between the liquid and gas. In one form, the bubbler uses porous metal or porous plastic with the pore size of about 0.5 to about 300 microns. In another form, the pore size is less than about 100 microns. However, other sizes may also be used. The bubble size can be variable but is preferably less than 0.01 cm. The surfactant concentration ranges from 3% (w/w) to 75% (w/w).

The dissociation of sulfonic acid can be reduced in a low pH solution. When pH is low, the proton concentration is high and the sulfonic acid from the surfactant may reduce the dissociation although the acid dissociation constant is high ($K_a \sim 10^{-2}$). In some cases, the surfactant acts as buffer for strong acids. For example, the organic sulfonic acid can contain as high as 7M sulfuric acid to increase detergent efficiency. In this regard, in a hydrogen bubble system, some acids can be added to increase the proton conductivity as needed.

Liquid electrolyte fuel cells may also be suitable for the features described herein. Such liquid electrolyte fuel cells may include alkaline fuel cells (AFC) and phosphoric acid fuel cells (PAFC). AFC uses alkaline electrolyte (for example 6M KOH solution), which circulate in the fuel cell with a glass fiber separator. AFCs oftentimes have problems with carbon dioxide poisoning, which reduces alkaline electrolyte conductivity. In AFCs, if the surfactant is in the form of salt, it can also generate hydrogen and oxygen bubbles to feed the fuel cell. Meanwhile, since the surfactant salt has a strong sulfonate group ($—SO_3—$), the $CO_2$ poisoning can be reduced and/or eliminated.

PAFC uses phosphoric acid as an electrolyte at approximately 200° C. At such high temperature, the phosphoric acid is not circulated, which can result in the fuel cell product water leaching out phosphoric acid. Further, PAFCs operate under very corrosive environmental conditions and need special bipolar plates.

In one form, the surfactants and features described herein may be used in the form of a bubbled composition with hydrogen and water. For example, in one form, such as in a PEMFC, the system uses a plurality of bubbles as a hydrogen carrier and the bubbler water as coolant to simplify the fuel cell system and increase the fuel cell efficiency. For example, in this form, the plates used in the fuel cell stack may be reduced as there may no longer be a need for a water plate. Instead, the bubble composition, which includes hydrogen, water, and surfactant, can remove sufficient heat and therefore eliminate the need for a separate coolant stream and water plate. In one form, water with surfactant may remove heat more than 60% faster than the pure water. In one form, this approach may also utilize high-pressure energy from hydrogen tank and bubble formation to push the bubbles into the fuel cell for circulation, which may also eliminate the need for a water pump, hydrogen humidifier and oxygen humidifier. In the case of a pressurized system, the hydrogen bubbler tank gas inlet could be about 80 psi and the fuel cell stack pressure could be up to 45 psi.

Use with a conventional proton exchange membrane.

In a PEMFC, the proton exchange membrane conducts protons effectively as long as the membrane remains well humidified. Water is essential for the fuel cell. Humidifiers are typically needed for both anode and cathode. However, if too much water is present, the catalyst surface is flooded and the reactant gases cannot reach the catalyst surface.

In one form, the surfactant has hydrophilic and hydrophobic properties, is nontoxic and not flammable. The surfactant reaches the catalysts and leaves space for gas penetration due to its hydrophobic tails because gaseous hydrogen and oxygen show hydrophobic properties. The surfactant bubbles carry water, which enables the proton exchange membrane to remain humidified while also increasing proton conduction. In some forms, the fuel cell performance could be doubled.

Use with a porous membrane separator.

In one form, the surfactant can be a strong acid and conducts protons. LABSA and other benzene sulfonic acid surfactants contain sulfonic acid, which is similar to the acid group found in Nafion, Flemion, and other proton exchange membranes. In one form, the surfactant is very soluble in water and the concentration of the surfactant can be adjusted as desired.

The separator can be porous polyethylene, polypropylene, or other polymers. Commercially available brands include, but are not limited to, Celgard membranes, Daramic membranes. Celgard separator and Daramic separator are used in lithium ion batteries and lead acid batteries.

The surfactant bubbler with hydrogen has high proton conductivity and increases the water boiling point more than 100° C. In this regard, the fuel cell may operate at temperature above the boiling point without jeopardizing the lifetime of the membrane. High temperature operation benefits the increase in efficiency and the tolerance of any catalyst poisoning.

Use with bipolar plates.

As described above, bipolar plates are the electronic conductors which separate the anode flow path and the cathode flow path. In some forms, the bipolar plate materials include graphite, graphite/resin or polymer composite, mold injected metal composite, metal closed cell foams, and pure sheet metals. The materials typically should be corrosion resistant and have no hydrogen embrittlement and oxygen related problems. However, bipolar plates suffer from many issues such as hot water leaching graphite powders, corrosion for both graphite and metal plates, mechanical strength degradation causing gas crossover, thermal expansion differences between plates and gasket materials which can cause gasket creeping and gas leaks, as well as other issues. Surface conductivity may also decrease over time and non-uniformity of plate properties as well as changes in plate properties over time may generate hot spots, which burn the proton exchange membrane, causing a fire hazard. Further, thermal conductivity changes can occur due to particulates from water and gases causing two or more plate connections to separate since cooling water runs between the plates.

In one form, in the system and methods described herein, the bipolar plates can be simplified to be a single plate rather than two or more plates. In other words, since the bubbled hydrogen and water can also function as a coolant, a separate coolant flow path and separator plate may not be necessary.

In the fuel cell, the internal resistance includes electrolyte membrane resistance, GDL bulk resistance, and bipolar bulk resistance, which are material resistance and hard to reduce. Interfacial junction resistances or contact resistances, such as bipolar plate/bipolar plate, bipolar plate/GDL, GDL/membrane, current connector/bipolar plates, current collector/outlet cable connector, are related to compression force and material surface properties. All the resistances generate heat when the fuel cell is under load. Bipolar plates with water cooling plates contain at least two plates overlapped. The interjection resistance is large due to the limited contact area with water flow channels and non-uniform plate flatness. For example, a 1 kW fuel cell stack may produce 1 kW heat upon the working voltage versus current. High voltage low current produces less heat. The contact resistance may generate up to 30% more heat. The reduction of the contact resistance can reduce the heat generation for better fuel cell efficiency. With bubbler cooling, the bipolar plates only contact GDLs and current collectors. In this form, there is no plate/plate interjection for coolant flow.

Further, in one form, the surfactant can be a corrosion resistant material, which reduces chemical and electrochemical corrosion. The adsorption of the surfactant on the bipolar plate surface generates a barrier for direct chemical pitting corrosion and electrochemical oxidation while maintaining a good electrical connection. The surfactant may also function as a uniform charge distributor to prevent short current due to surface defects or any possible residues, which normally occur from catalyst erosion (for example carbon black lose).

Figure 2:
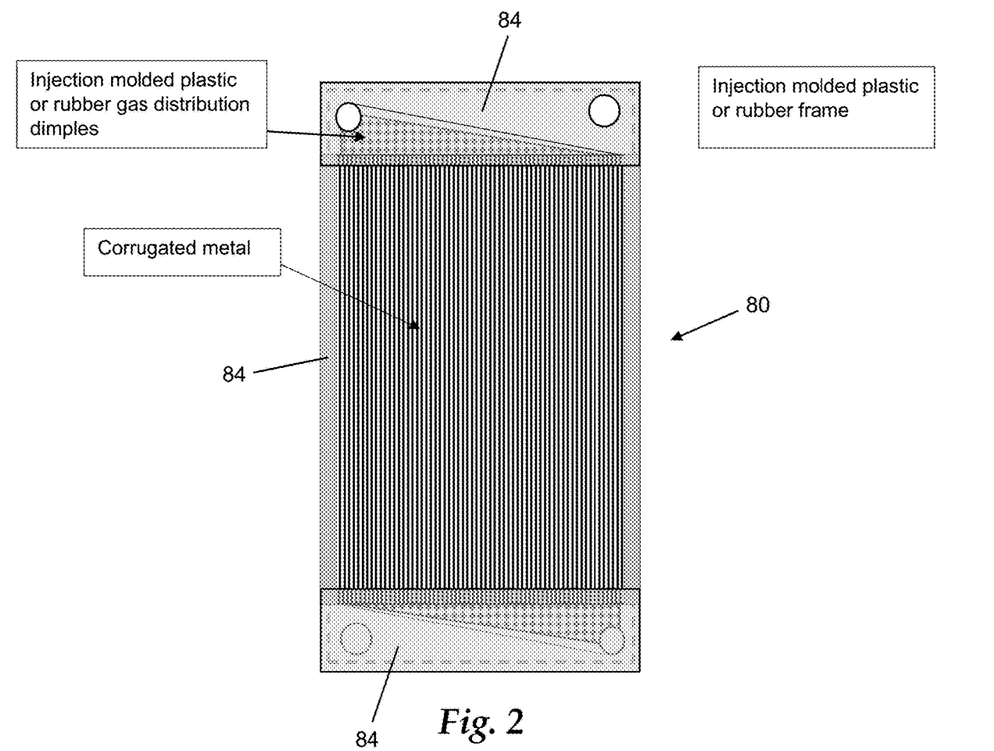
FIG. 2 is one form of a bipolar plate for bubble fed fuel cells.

For example, metal bipolar plates can be chosen used, such as shown in FIG. 2. As shown in FIG. 2, the bipolar plate 80 has two sides (anode and cathode), where the anode and cathode sides are generally mirror images of one another. A corrugated metal sheet 82 is in the middle surrounded by the injection molded plastic or rubber materials 84 with dimples for gas distribution. The corrugated metal sheets 82 enable the metal thickness to be uniform and the rib at the top as flat as possible to have a good contact with gas diffusion electrodes (FIG. 1B). It is very difficult to produce the rib top in a completely flat configuration in machined graphite compared as well as in pressed or punched metal sheets. Rolled corrugated metal sheet has those advantages over the pressed or punched metal sheets for mass production. The corrugated metal maintains the uniform thickness while pressed metal typically does not, especially at the flow channel area, as the ribs are very thin due to metal elongation. Obviously the rib area has more compression force and the thin rib cannot tolerate long term operation. With the surfactant bubbling system, no cooling water is needed and no cooling plates are needed. Both sides of the plate have uniform distribution and pressure drop with straight flow channels is lower than other serpentine flow.

Figure 3:
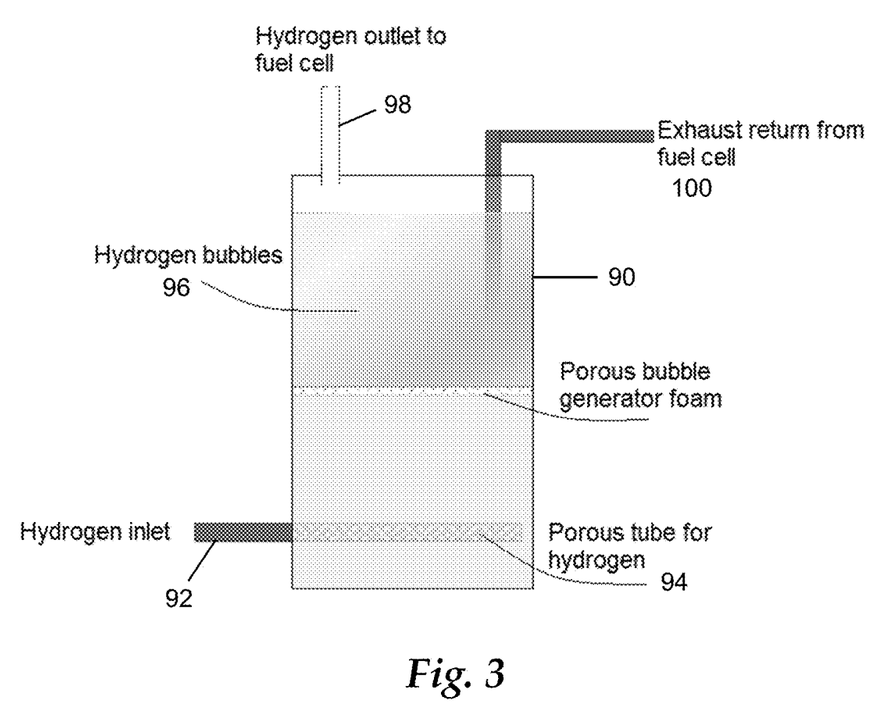
FIG. 3 is an exemplary form of a hydrogen bubble generator.

One form of a gas bubbler is shown in FIG. 3. More specifically, a bubbler tank 90 is shown having hydrogen entering at 92. Once inside the tank, the hydrogen may exit via a porous tube 94 in the tank 90 to distribute the hydrogen evenly at the bottom of the tank 90. According to one form, the porous metal tube 94 is mounted in the middle of the tank and generates small bubbles. The controlled porosity may range from about 100 microns down to about 0.5 microns with the bubble size less than about 100 microns. Hydrogen bubbles 96 exit the tank 90 at outlet 98 are fed into fuel cells and the exhaust returns back to the tank at return 100. The exhaust can include water and other components. Check valves, other valves, gauges, and the like may also be utilized, but are not shown in the figure. Water cooling with bubbles is also fed into fuel cells. No water pump is necessary.

Figure 4A:
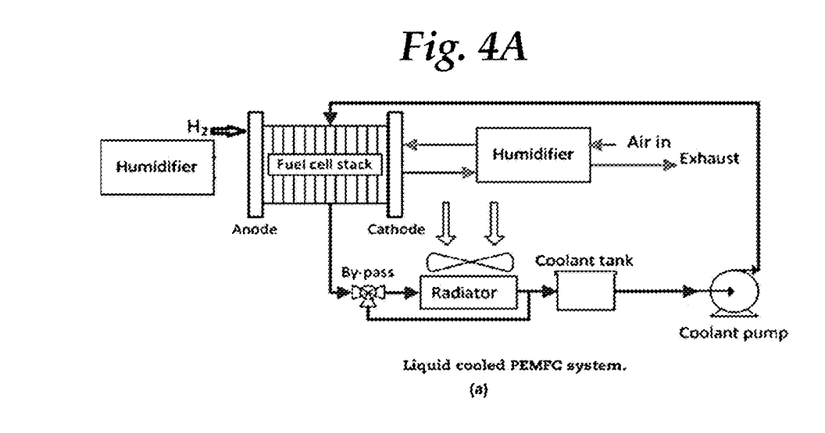
FIG. 4A illustrates a liquid cooled PEMFC.
Figure 4B:
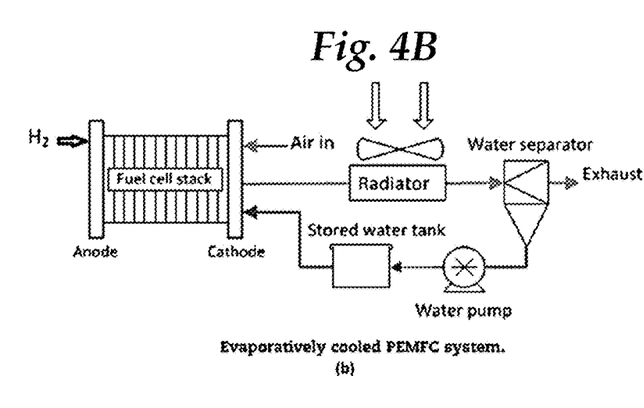
FIG. 4B illustrates a vapor cooled PEMFC.
Figure 4C:
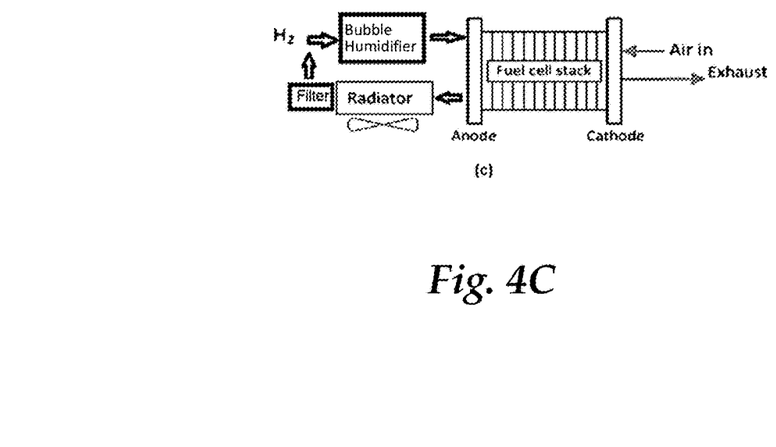
FIG. 4C illustrates a bubble cooled PEMFC.

FIG. 4C shows a fuel cell stack system configuration using the bubbles. FIG. 4A shows a similar fuel cell stack system that instead uses a traditional humidification system and liquid coolant. FIG. 4B shows a fuel cell stack system using vapor cooling. It should be appreciated that use of evaporative cooling is difficult to achieve uniform cooling of the fuel cell stack. Similarly, liquid cooling results in a much more complicated fuel cell stack design. Further, as shown in FIGS. 4A-4B, both liquid cooling and vapor cooling need water pump. When using a bubble cooling system, it may be possible to avoid the need for a water pump.

When using a bubbled hydrogen stream, that may also contain water, it may be possible to achieve a number of benefits, depending on the configuration of the system. For example, such a system may be used to cool the catalyst surface where needed. In this form, the bubbles may carry water to the surface of the catalyst to permit direct cooling instead of relying on conduction and/or convection to transfer heat to the separate coolant flow path in conventional fuel cells. Similarly, the surfactant/bubbles may function as a hydrogen carrier to bring the hydrogen to the catalyst surface.

In other forms, as described above, it may be possible to eliminate separate coolant flow paths, separator plates, pumps, and the like. Instead, the bubbles and/or water can function as a coolant in one or more of the reactant flow paths.

In one form, the bubbled hydrogen and water can function on the catalyst surface to manage the water path, gas path, and product path. In other words, in this form, the fuel cell stack has good water management. Once the bubbles reach the gas diffusion electrode and catalyst surface, the bubbles break down on the high surface catalyst surface. Thus the hydrogen has two forms, one is hydrogen gas and the other is hydrogen gas bubble. Both hydrogen gas and hydrogen bubble react on the catalyst surface. The surfactant bridges the gas, water/proton, and solid catalyst with its hydrophilic/hydrophobic bifunctional properties.

Furthermore, in one form, impurities from hydrogen, such as ammonia and chlorine and impurities from air can accumulate on catalyst layer. By using the surfactant and bubbled hydrogen concepts discussed herein, these impurities can be dissolved and/or washed away with the surfactant. Ammonia reacts with the acidic bubbles and chlorine reacts with the long chain hydrocarbon or benzene ring if available. This feature helps prevent the impurities from harming the fuel cell components while sacrificing a very small amount of surfactant.

In some forms, the features described herein can be used in other types of fuel cells besides PEMFCs. For example, a salt based surfactant may be used in alkaline fuel cells to distribute gas uniformly and eliminate carbon dioxide poisoning.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of Applicant's contribution. The actual scope of the protection sought is intended to be defined in the following claims when viewed in their proper perspective based on the prior art.

What is claimed is:

1. A method for operating a fuel cell, the method comprising the steps of:
   providing at least one fuel cell having an anode side fluid flow path and a cathode side fluid flow path;
   flowing an anode reactant composition through the anode side fluid flow path, the anode reactant composition comprising a plurality of bubbles containing hydrogen gas, the plurality of bubbles comprising a surfactant containing the hydrogen gas; and reacting the hydrogen gas from the anode reactant composition at the anode to produce protons.

2. The method of claim 1 wherein the surfactant is a sulfonic acid surfactant or phosphonic acid.

3. The method of claim 1 wherein the surfactant is a linear alkyl benzene sulfonic acid.

4. The method of claim 1 wherein the surfactant is selected from the group consisting of alkyldiphenyloxide disulfonic acid, octanesulfonic acid, methanesulfonic acid, 1-dodecanesulfonic acid, perfluoroctanesulfonic acid (PFOS), perfluorohexane sulfonic acid, and combinations thereof.

5. The method of claim 1 wherein the surfactant is selected from the group consisting of n-decylphosphonic acid, n-dodecylphosphonic acid, n-hexadecylphosphonic acid, n-hexylphosphonic acid, n-octadecylphosphonic acid, n-octylphosphonic acid, n-tetradecylphosphonic acid, and combinations thereof.

6. The method of claim 1 wherein the anode reactant composition further comprises water, wherein at least a portion of the water is part of the plurality of bubbles.

7. The method of claim 1 wherein the anode reactant composition further comprises sulfuric acid or phosphoric acid as needed.

8. The method of claim 1 further comprising the step of removing heat from the fuel cell via at least a portion of the anode reactant composition exiting the fuel cell.

9. The method of claim 6 wherein the fuel cell does not include a separate coolant flow path besides the anode side fluid flow path.

10. The method of claim 1 further comprising the step of removing impurities from the fuel cell via at least a portion of the anode reactant composition exiting the fuel cell.

11. The method of claim 8 wherein the heat is removed from both the anode and cathode.

12. A fuel cell system comprising:
a plurality of fuel cells,
each fuel cell comprising a membrane separating an anode side fluid flow path and a cathode side fluid flow path, the anode side fluid flow path receiving an anode reactant composition, the anode reactant composition comprising a plurality of bubbles containing hydrogen gas, the plurality of bubbles comprising a surfactant containing the hydrogen gas, the hydrogen gas reacting at the anode to create protons, and the protons reacting at the cathode.

13. The system of claim 12 further comprising a separator plate separating adjacent fuel cells, the separator plate includes flow fields for creating the anode side fluid flow path and the cathode side fluid flow path for adjacent fuel cells.

14. The system of claim 13 wherein the anode side fluid flow path also functions as a coolant flow path whereby at least a portion of the anode reactant composition removes heat from the fuel cell.

15. The system of claim 14 wherein the fuel cell does not include a separate coolant flow path besides the anode side fluid flow path.

16. The system of claim 12 wherein at least a portion of the anode reactant composition removed impurities from the fuel cell.

17. The system of claim 12 wherein the surfactant is a sulfonic acid surfactant or phosphonic acid.

18. The system of claim 12 wherein the surfactant is a linear alkyl benzene sulfonic acid.

19. The system of claim 12 wherein the surfactant is selected from the group consisting of alkyldiphenyloxide disulfonic acid, octanesulfonic acid, methanesulfonic acid, 1-dodecanesulfonic acid, perfluoroctanesulfonic acid (PFOS), perfluorohexane sulfonic acid, and combinations thereof.

20. The system of claim 12 wherein the surfactant is selected from the group consisting of n-decylphosphonic acid, n-dodecylphosphonic acid, n-hexadecylphosphonic acid, n-hexylphosphonic acid, n-octadecylphosphonic acid, n-octylphosphonic acid, n-tetradecylphosphonic acid, and combinations thereof.

21. The system of claim 12 wherein the surfactant is a sulfonic acid surfactant or phosphonic acid.

* * * * *